3,205,201
FLEXIBLE BLOCKED ALIPHATIC ISOCYANATE POLYMERS PREPARED IN THE PRESENCE OF A METAL-CONTAINING CATALYST

Herbert Friedrich, Worms, Wolfgang Lehnerer, Ludwigshafen (Rhine), and Karl Sepp, Neustadt, Weinstrasse, Germany, assignors to Badische Anilin- & Soda-Fabrik Aktiengesellschaft, Ludwigshafen (Rhine), Germany
No Drawing. Filed Dec. 8, 1958, Ser. No. 778,625
Claims priority, application Germany, Dec. 11, 1957, B 47,096
13 Claims. (Cl. 260—77.5)

This invention relates to flexible isocyanate polymers and to the production of flexible isocyanate polymers from aliphatic di-isocyanates.

It is known to polymerize organic di- or poly-isocyanates to form resinous products. If the polymerization is discontinued prematurely, oily to soft intermediate products are obtained having free isocyanate groups. If the polymerization is carried to its end, hard and brittle resins are obtained. Isocyanate polymers are used, inter alia, as adhesives and raw materials for lacquers. Polymerization is carried out in substance or in solution in the presence of catalysts. Oxygen, metal salts or metal complex compounds and strongly basic tertiary amines are known as being catalytically active.

We have now found that flexible isocyanate polymers of good mechanical strength are obtained by polymerizing with the aid of a metal-containing catalyst a mixture in the molar ratio of 1:1 to 1:0.06 of a monomeric or partly polymerized aliphatic di-isocyanate and a hydrocarbon compound or halogenated hydrocarbon compound of the molecular weight 45 to 440 which has one functional group with at least one reactive hydrogen atom and is capable of adding on to an isocyanate. In contrast to the brittle and pulverizable isocyanate resins hitherto known, the isocyanate polymers prepared according to this invention are flexible to tough elastic.

By aliphatic di-isocyanates we mean compounds of the type ONC—X—NCO in which X is a divalent aliphatic radical.

In admixture with hydrocarbon compounds which have a functional group capable of adding on to isocyanates, aromatic and hydroaromatic isocyanates yield only brittle and hard resins when polymerized. However, flexible polymers can be obtained, often characterized by especially good strength properties, from mixtures of aliphatic di-isocyanates with aromatic or hydroaromatic isocyanates. Up to 40% of aromatic or hydroaromatic isocyanates, for example phenyl isocyanate, naphthylene-1.5-di-isocyanate, cyclohexyl-1.4-di-isocyanate or dicyclohexyl-4.4'-di-isocyanate, may be added to the aliphatic di-isocyanates without the polymers losing their flexible character.

Examples of hydrocarbon compounds or halogenated hydrocarbon compounds which have one functional group capable of adding on to isocyanates are monohydric alcohols, monoamines, monocarboxylic acids or mercaptans. Relatively low molecular compounds with molecular weights of 45 to 440 are used. Above all there are suitable the compounds of the aliphatic and cycloaliphatic series and, of these, the aliphatic monohydric alcohols and monoamines with 3 to 18 carbon atoms, which may be linear or branched and, in the case of the monoamines, may be primary or secondary. As examples there may be mentioned normal propanol, normal butanol, tertiary butanol, 2-ethylhexanol, stearyl alcohol, normal hexylamine, iso-octylamine and dibutylamine. Cycloaliphatic alcohols or amines with 3 to 18 carbon atoms, for example cyclohexylamine, dicyclohexylamine, cyclohexanol or beta-decahydronaphthol, are also suitable. Furthermore aliphatic or cycloaliphatic monocarboxylic acids with 3 to 18 carbon atoms, as for example butyric acid or stearic acid, are suitable. These compounds may also be unsaturated or substituted by halogen. They should, however, not contain any second substituents capable of reacting with isocyanates with crosslinking. Unsaturated or halogenated hydrocarbon compounds which contain only one functional group capable of being added on to isocyanates are for example ethylene chlorhydrin, chlorbutanol, allyl alcohol or oleic acid.

The mechanical properties of the polymers, such as strength, elasticity and flexibility, depend, in addition to the isocyanates used, to a great extent on the nature and amount of compound capable of adding on to isocyanates that is employed in the process. With long-chained compounds there are in general obtained softer and more flexible products than with short-chained or cyclic compounds. The mixture to be polymerized should contain from 0.06 to 1 mol of compound capable of adding on to isocyanates to 1 mol of di-isocyanate. With less than 0.06 mol to 1 mol of di-isocyanate, the polymers are brittle whereas with more than 1 mol soft and sticky products are obtained.

The polymerization of the isocyanates is carried out with metal-containing catalysts because the stability to aging or the mechanical strength of the polymers (for example, the tearing strength of foils) is not sufficient when polymerization is effected with other catalysts, for example with tertiary amines or in the presence of oxygen. Suitable catalysts include alcoholates of earth metals, alkaline earth metals, and alkali metals as well as the alcoholates of metals such as titanium and tin. Salts of the above metals with carboxylic acids such as acetic acid, and with mineral acids such as hydrochloric acid, may also be used in the process. It is of advantage to use aluminum alcoholates, for example aluminum beta-decalolate, aluminum butylate or aluminum dimethylaminopropylate, because these strongly accelerate the polymerization even in small concentrations and do not lead to dark coloration of the polymers. Instead of aluminum alcoholates there may also be used alcoholates of other metals, as for example sodium methylate or sodium stearylate, as catalysts. Similarly, inorganic metal salts, such as titanium tetrachloride or metal salts or organic acids, for example calcium acetate, aluminum stearate or aluminum oxybutyrate, or also metal complex compounds, such as tin acetyl acetonate, are also well suited. The strongly active aluminum alcoholates are preferably used in amounts of 0.05 to 0.5% with reference to the weight of di-isocyanate. Of the less active metal catalysts, there may also be used larger amounts, up to about 3%. Catalysts which are insoluble in the reaction mixture are kept in suspension.

The polymerization is preferably carried out at an elevated temperature. The temperature depends on the catalyst concentration and on the reactivity of the mixture to be polymerized. When using aluminum alcoholates in 0.1% solution or suspension, the polymerization can in general be completed in a few hours at 130° to 150° C. With catalysts of lesser activity, for example with calcium acetate, it is better to work at higher temperatures, for example 180° C. It is possible to polymerize in substance or in solution. For solution polymerization there are suitable solvents which contain no groups reactive with isocyanate groups, for example hydrocarbons, chlorohydrocarbons, acetone, esters or ethers. Solution polymerization in general proceeds more slowly than polymerization in substance.

There are various methods of operation by which the flexible isocyanate polymers according to this invention can be prepared. For example, there may first be prepared a mixture of di-isocyanate and hydrocarbon compound capable of adding on to the di-isocyanate and then this mixture may be polymerized with the aid of a metal catalyst. In this case it is possible to work according to the following variants: The addition of the hydrocarbon compound to the di-isocyanate may first be effected by heating the mixture and only then the polymerization initiated by addition of catalyst; or the catalyst may be added from the start and the mixture containing the catalyst heated. The addition reaction and the polymerization then proceed in parallel. Finally, it is also possible to begin with the polymerization of the di-isocyanate and to add the compound capable of adding on to the di-isocyanate only during the course of the polymerization. The addition and adding on to the di-isocyanate must obviously be concluded before the equivalent number of isocyanate groups has been used up by polymerization.

For many purposes it is of advantage not to effect complete polymerization of the mixture immediately but to discontinue the polymerization while the mixture is still in an oily, readily deformable condition. The polymerization may readily be stopped by cooling the reaction mixture. This is preferably effected when the NCO-content of the mixture still amounts to about 10 to 20% by weight. This point in time is ascertained by following the course of the polymerization by analytical determination of the free isocyanate groups. The oily reaction product can then be kept unchanged in a closed vessel at room temperature and is convenient for further working up since by further heat treatment or addition of catalyst it can be hardened out to form any desired shaped structures. It is preferable to use temperatures between 50° and 150° C. or even higher temperatures up to 200° C. Air or steam accelerate the hardening out.

In the hardened state, the polymers are elastic and flexible plastics of high mechanical strength. They are crosslinked and therefore infusible and in organic solvents they are insoluble or only swellable. They are stable to acids or bases. Discoloration takes place in the air at about 200° C. The products are especially suitable for the production of flexible foils and pressed articles. The oils which are still not hardened out may be used undiluted or mixed with solvents for casting foils, for preparing dippetd articles or as adhesive or brushing solutions. Solvents suitable for mixing with the unhardened oils are hydrocarbons, chlorohydrocarbons, acetone, esters or ethers. The polymers prepared according to this invention may find employment in numerous fields, including use for electrical insulating purposes.

The following examples will further illustrate this invention but the invention is not restricted to these examples. The parts specified in the examples are parts by weight.

*Example 1*

500 parts of crude hexamethylene di-isocyanate (prepared from hexamethylene diamine and phosgene and not subjected to any special purification) are mixed with 10 parts of a 4% solution of aluminum butylate in butanol and the mixture heated in a stirring vessel under nitrogen to 140° C. After an hour, the NCO-content of the mixture has fallen from 48.4% to 36.3%. Then within an hour 130 parts of 2-ethylhexanol are allowed to flow in and the temperature is kept for another 3 hours at 140° C. A yellow colored oil with a NCO-content of 11.5% is thus obtained. The oil may be mixed with toluene, chlorbenzene, ethyl acetate or acetone.

If the oil is spread out in a thin layer on a plate and heated for an hour at 130° with access of air, there is obtained a flexible transparent foil of high strength.

It can also be hardened out without external supply of heat by adding 1 part of aluminum butylate in toluene solution to 50 parts of the oil with the isocyanate content of 11.5%. The product then hardens out in half an hour with slight spontaneous heating up. When 6 parts of aluminum butylate are added, the said hardening out is ended in a few minutes.

*Example 2*

300 parts of hexamethylene di-isocyanate are heated with 5 parts of aluimnum oxybutyrate and 3 parts of calcium acetate to 180° C. in a stirring vessel under nitrogen. At this temperature, a further 300 parts of hexamethylene di-isocyanate are allowed to flow in. The temperature is then allowed to fall to 140° C. and 90 parts of normal butanol are added in small portions. After an hour, the reaction mixture is diluted with toluene and separated from the catalyst suspension by filtration. After evaporating the solvent, the residual viscous oil is hardened at 130° C. A tough elastic plastic is obtained.

*Example 3*

500 parts of hexamethylene di-isocyanate are heated with 10 parts of a 5% aluminum butylate solution for several hours until the isocyanate content has fallen to 28.5%. The polymer is diluted with twice the amount of chlorbenzene and at 80° C., 150 parts of dibutylamine are added in small portions. The solution can be poured into moulds. After evaporating the solvent and hardening out at 130° C., transparent flexible shaped articles are obtained.

Similar products are obtained by using 150 parts of 2-ethylhexylamine instead of dibutylamine.

*Example 4*

300 parts of hexamethylene di-isocyanate are reacted with 180 parts of oleic acid at 140° C. in a stirring flask and then 6 parts of a 5% solution of aluminum butylate in butanol are added. After heating for several hours, the NCO-content has fallen to 12u. An oil is obtained which may be converted into an elastic plastic by further heating.

If 84 parts of phenol are added instead of oleic acid and a corresponding procedure is followed, a product is obtained which may be worked up to stiff foils.

*Example 5*

130 parts of 2-ethylhexanol are allowed to drip at 100° C. into a mixture of 360 parts of hexamethylene di-isocyanate, 40 parts of naphthylene-1.5-di-isocyanate and 10 parts of a 10% solution of aluminum dimethylamino propylate in butanol. After heating for six hours at 140° C., the isocyanate content of the mixture has fallen to 17%. The resultant yellow colored oil is cooled.

Flexible, supple foils can be prepared by hardening out at 150° C.

*Example 6*

200 parts of hexamethylene di-isocyanate are allowed to react at 100° C. with 60 parts of ethylene chlorhydrin and then 5 parts of an 8% solution of aluminum butylate in butanol are added to the reaction mixture. At a temperature of 140° C., the isocyanate content falls to 12% in 2 hours. The oil obtained can be converted into an elastic plastic by further heat treatment.

*Example 7*

A mixture of 200 parts of hexamethylene di-isocyanate and 5 parts of an 8% solution of aluminum butylate in butyl alcohol is first reacted at 100° C. with 35 parts of allyl alcohol and then stirred for 2 hours at 140° C. The NCO-content of the mixture falls to 13%. The oil obtained is spread out on a flat plate and heated for some hours at 130° C. A flexible transparent foil of high strength is obtained.

*Example 8*

19 parts of 2-ethylhexanol are dripped at 100° C. into 100 parts of octamethylene di-isocyanate in a stirring vessel. After adding 6 parts of a 5% solution of aluminum butylate in toluene, the mixture is heated for 5 hours at 140° C. while stirring. The oil obtained, when spread in a thin layer and heated for several hours at 140° C., yields a soft, supple film.

*Example 9*

200 parts of hexamethylene di-isocyanate are heated to 100° C. while stirring. Then a mixture of the following components is dripped in during the course of 30 minutes: 65 parts of beta-decalol, 35 parts of allyl alcohol, 6 parts of aluminum-beta-decalolate dissolved in 12 parts of 2-ethyl-hexanol. The mixture is then left for another 15 minutes at 95° to 100° C. The NCO-content of the reaction mixture then amounts to 16.2%. The oily reaction product is then hardened out by heating for five hours at 130° C. in a cylindrical glass vessel to an elastic rod of good mechanical strength.

We claim:

1. A process for producing flexible isocyanate polymers which comprises: heating to a temperature between 80 and 180° C. a mixture comprising
   (A) an aliphatic di-isocyanate, and
   (B) a compound that is monofunctional with respect to isocyanate radicals, said compound being selected from the group consisting of aliphatic and cycloaliphatic unsubstituted monoalcohols having 3 to 18 carbon atoms, primary aliphatic unsubstituted monoamines having 3 to 18 carbon atoms, secondary aliphatic unsubstituted monoamines having 3 to 18 carbon atoms, aliphatic monocarboxylic acids having 3 to 18 carbon atoms, halogenated aliphatic and cycloaliphatic monoalcohols having 2 to 18 carbon atoms, primary and secondary monoamines having 2 to 18 carbon atoms, and monocarboxylic acids having 2 to 18 carbon atoms,
said compounds (B) having a molecular weight of from 45 to 440, the molar ratio of compounds (A) to (B) being between 1:1 to 1:0.06, said mixture also containing from 0.05 to 3% by weight with reference to the weight of said di-isocyanate of (C) a catalyst selected from the group consisting of alkali metal, alkaline earth metal, aluminum, titanium, and tin (a) alcoholates, (b) carboxylic acid salts, and (c) mineral acid salts.

2. A process as in claim 1 wherein compound (B) is 2-ethyl hexanol.

3. A process as in claim 1 wherein compound (B) is allyl alcohol.

4. A process as in claim 1 wherein compound (B) is ethylene chlorhydrin.

5. A process as in claim 1 wherein compound (B) is n-hexylamine.

6. A process as in claim 1 wherein compound (B) is di-n-butylamine.

7. A process for producing flexible isocyanate polymers as in claim 1 wherein compound (B) is added to compound (A), said addition step being completed before the equivalent number of isocyanate groups has been used up by polymerization.

8. A process for producing flexible isocyanate polymers as in claim 1 wherein the polymerization is stopped by cooling the mixture when the isocyanate content of the reaction mixture is between 10% to 20% by weight of the total, whereupon the polymerization is completed at a subsequent time.

9. Flexible isocyanate polymers prepared by the process set forth in claim 1.

10. Flexible isocyanate polymers prepared by the method set forth in claim 2.

11. Flexible isocyanate polymers prepared by the method set forth in claim 3.

12. Flexible isocyanate polymers prepared by the method set forth in claim 4.

13. Flexible isocyanate polymers prepared by the method set forth in claim 5.

References Cited by the Examiner

UNITED STATES PATENTS

| | | | |
|---|---|---|---|
| 2,374,136 | 4/45 | Rothrock | 260—77.5 |
| 2,459,439 | 1/49 | Lichty et al. | 260—77.5 |
| 2,801,990 | 8/57 | Seeger et al. | 260—77.5 |
| 2,810,711 | 10/57 | Holtschmidt | 260—77.5 |
| 2,926,148 | 2/60 | Leclercq | 260—77.5 |
| 2,952,665 | 9/60 | Bunge | 260—77.5 |
| 2,954,365 | 9/60 | Windemuth | 260—77.5 |
| 2,978,449 | 4/61 | France | 260—248 |
| 2,979,485 | 4/61 | Burkus | 260—75 |

FOREIGN PATENTS 1,004,850  7/58  Germany.

LEON J. BERCOVITZ, *Primary Examiner.*

MILTON STERMAN, L. N. BURSTEIN, *Examiners.*

UNITED STATES PATENT OFFICE
CERTIFICATE OF CORRECTION

Patent No. 3,205,201                         September 7, 1965

Herbert Friederich et al.

It is hereby certified that error appears in the above numbered patent requiring correction and that the said Letters Patent should read as corrected below.

Column 3, line 44, for "dippetd" read -- dipped --; column 4, line 34, for "12U" read -- 12% --.

Signed and sealed this 2nd day of August 1966.

(SEAL)
Attest:

ERNEST W. SWIDER
Attesting Officer

EDWARD J. BRENNER
Commissioner of Patents